US012775638B2

(12) United States Patent
Zhou

(10) Patent No.: US 12,775,638 B2
(45) Date of Patent: Oct. 27, 2026

(54) OBJECT SIMILARITY DETERMINING METHODS AND APPARATUSES, AND OBJECT RECOMMENDATION METHODS AND APPARATUSES

(71) Applicant: Alipay (Hangzhou) Information Technology Co., Ltd., Hangzhou (CN)

(72) Inventor: Qixian Zhou, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 2 days.

(21) Appl. No.: 19/034,173

(22) Filed: Jan. 22, 2025

(65) Prior Publication Data

US 2025/0238440 A1 Jul. 24, 2025

(30) Foreign Application Priority Data

Jan. 22, 2024 (CN) ......................... 202410089317.0

(51) Int. Cl.

| | |
|---|---|
| ***G06F 16/00*** | (2019.01) |
| ***G06F 16/28*** | (2019.01) |
| ***H04L 9/00*** | (2022.01) |
| ***H04L 9/30*** | (2006.01) |

(52) U.S. Cl.

CPC ............ *G06F 16/285* (2019.01); *H04L 9/008* (2013.01); *H04L 9/30* (2013.01)

(58) Field of Classification Search

None

See application file for complete search history.

(56) References Cited

U.S. PATENT DOCUMENTS

2017/0104752 A1* 4/2017 Sakemi ................. H04L 9/0618
2024/0169087 A1* 5/2024 Takahashi ........... G06F 21/6245

FOREIGN PATENT DOCUMENTS

CN 106790069 B 3/2020
CN 114978623 B 11/2023

OTHER PUBLICATIONS

Extended European Search Report in European Appln. No. 25153320.4, mailed on Jun. 17, 2025, 13 pages.

* cited by examiner

*Primary Examiner* — Anhtai V Tran

(74) *Attorney, Agent, or Firm* — Fish & Richardson P.C.

(57) ABSTRACT

Implementations of this specification provide methods and apparatuses for object similarity determining and object recommendation. In an example object similarity determining method, object cipher state representations of a first object and a second object are obtained; a representation compensation factor of an object cipher state representation relative to an object plaintext representation in a cipher state representation mode is determined; and an object similarity between the first object and the second object is determined with reference to the representation compensation factor and the object cipher state representations of the first object and the second object.

20 Claims, 7 Drawing Sheets

OBJECT SIMILARITY DETERMINING METHODS AND APPARATUSES, AND OBJECT RECOMMENDATION METHODS AND APPARATUSES

CROSS-REFERENCE TO RELATED APPLICATIONS

This application claims priority to Chinese Patent Application No. 202410089317.0, filed on Jan. 22, 2024, which is hereby incorporated by reference in its entirety.

TECHNICAL FIELD

Embodiments of this specification generally relate to the field of computer technologies, and in particular, to object similarity determining methods and apparatuses, and object recommendation methods and apparatuses.

BACKGROUND

With continuous development of artificial intelligence (AI) technologies, various types of objects (for example, images, speeches, videos, and texts) can be converted into corresponding representations (for example, vectors in high-dimensional space) by using pre-trained models. Moreover, distances between identical or similar objects in corresponding representation space are also very close. As privacy preserving is receiving more attention, how to use object cipher state representations in a cipher state representation model to reflect a similarity between objects is of great significance. This can further be applied to object recommendation scenarios, etc. to provide a privacy-preserving object recommendation solution.

SUMMARY

In view of the above, embodiments of this specification provide object similarity determining methods and apparatuses, and object recommendation methods and apparatuses. The methods and apparatuses can be used to determine an object similarity based on cipher state representations, thereby helping preserve privacy of raw data.

According to one aspect of embodiments of this specification, an object similarity determining method is provided and includes: obtaining object cipher state representations of a first object and a second object; determining a representation compensation factor of an object cipher state representation relative to an object plaintext representation in a cipher state representation mode; and determining an object similarity between the first object and the second object based on the object cipher state representations of the first object and the second object and the representation compensation factor.

According to another aspect of embodiments of this specification, an object recommendation method is provided and includes: obtaining an object cipher state representation of a reference object and an object cipher state representation of each candidate object in a candidate object set; determining a representation compensation factor of an object cipher state representation relative to an object plaintext representation in a cipher state representation mode; determining an object similarity between the reference object and each candidate object based on the object cipher state representations of the reference object and each candidate object and the representation compensation factor; and recommending a target object based on the determined object similarity.

According to still another aspect of embodiments of this specification, an object similarity determining apparatus is provided and includes: a cipher state representation obtaining unit, configured to obtain object cipher state representations of a first object and a second object; a representation compensation factor determining unit, configured to determine a representation compensation factor of an object cipher state representation relative to an object plaintext representation in a cipher state representation mode; and a similarity determining unit, configured to determine an object similarity between the first object and the second object based on the object cipher state representations of the first object and the second object and the representation compensation factor.

According to yet another aspect of embodiments of this specification, an object recommendation apparatus is provided and includes: a cipher state representation obtaining unit, configured to obtain an object cipher state representation of a reference object and an object cipher state representation of each candidate object in a candidate object set; a representation compensation factor determining unit, configured to determine a representation compensation factor of an object cipher state representation relative to an object plaintext representation in a cipher state representation mode; a similarity determining unit, configured to determine an object similarity between the reference object and each candidate object based on the object cipher state representations of the reference object and each candidate object and the representation compensation factor; and an object recommendation unit, configured to recommend a target object based on the determined object similarity.

According to another aspect of embodiments of this specification, an object similarity determining apparatus is provided and includes at least one processor and a memory coupled to the at least one processor. The memory stores instructions. When the instructions are executed by the at least one processor, the at least one processor is enabled to perform the above-mentioned object similarity determining method.

According to another aspect of embodiments of this specification, an object recommendation apparatus is provided and includes at least one processor and a memory coupled to the at least one processor. The memory stores instructions. When the instructions are executed by the at least one processor, the at least one processor is enabled to perform the above-mentioned object recommendation method.

According to another aspect of embodiments of this specification, a computer-readable storage medium is provided. The computer-readable storage medium stores a computer program. When the computer program is executed by a processor, the above-mentioned object similarity determining method and/or object recommendation method are/is implemented.

According to another aspect of embodiments of this specification, a computer program product is provided and includes a computer program. The computer program is executed by a processor to implement the above-mentioned object similarity determining method and/or object recommendation method.

BRIEF DESCRIPTION OF DRAWINGS

The essence and advantages of the content of this specification can be further understood by referring to the following accompanying drawings. In the accompanying drawings, similar components or features can have the same reference numerals.

DESCRIPTION OF EMBODIMENTS

The subject matter described here will be discussed below with reference to example implementations. It should be understood that these implementations are merely discussed to enable a person skilled in the art to better understand and implement the subject matter described in this specification, and are not intended to limit the protection scope, applicability, or examples described in the claims. Functions and arrangements of elements under discussion can be changed without departing from the protection scope of the embodiment content of this specification. Various processes or components can be omitted, replaced, or added in the examples as needed. In addition, features described for some examples can also be combined in other examples.

As used in this specification, the term "include" and its variant represent open terms, meaning "including but not limited to". The term "based on" means "at least partially based on". The terms "one embodiment" and "an embodiment" represent "at least one embodiment". The term "another embodiment" represents "at least one other embodiment". The terms "first", "second", etc. can refer to different or the same objects. Other definitions, whether explicit or implicit, can be included below. Unless explicitly stated in the context, the definition of a term is consistent throughout this specification.

In this specification, the term "homomorphic encryption" can refer to a special public key encryption scheme, where operations in ciphertext domain are equivalent to corresponding operations in plaintext domain after decryption.

In this specification, the term "representation database" is constructed by extracting objects such as texts, pictures, and speeches into a feature representation (such as a vector) by using an AI technology such as a large model, and then saving the feature representation in a structured manner. A basic data unit of the "representation database" is the representation, which can be used for subsequent storage, retrieval, and analysis.

The object similarity determining methods and apparatuses, and object recommendation methods and apparatuses according to embodiments of this specification are hereinafter described in detail with reference to the accompanying drawings.

Figure 1:
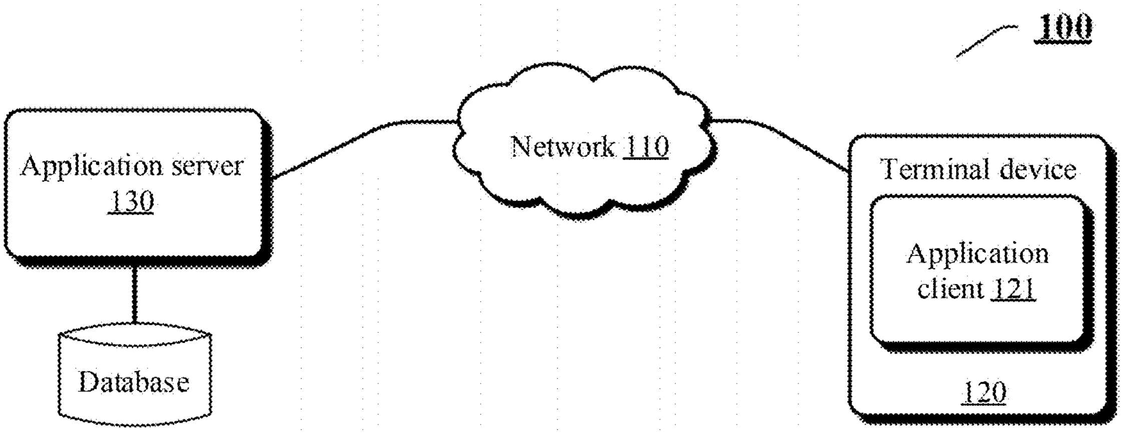
FIG. 1 illustrates an example architecture of an object similarity determining method and apparatus and an object recommendation method and apparatus, according to some embodiments of this specification.

FIG. 1 illustrates an example architecture 100 of an object similarity determining method and apparatus and an object recommendation method and apparatus, according to some embodiments of this specification.

In FIG. 1, a network 110 is used to interconnect a terminal device 120 and an application server 130.

The network 110 can be any type of network capable of interconnecting network entities. The network 110 can be a single network or a combination of various networks. In terms of coverage, the network 110 can be a local area network (LAN), a wide area network (WAN), etc. In terms of carrier media, the network 110 can be a wired network, a wireless network, etc. In terms of data switching technologies, the network 110 can be a circuit switched network, a packet switched network, etc.

The terminal device 120 can be any type of electronic computing device capable of connecting to the network 110, accessing a server or website on the network 110, processing data or signals, etc. For example, the terminal device 120 can be a desktop computer, a laptop computer, a tablet computer, a smartphone, etc. Although only one terminal device is shown in FIG. 1, it should be understood that a different quantity of terminal devices can be connected to the network 110.

In an implementation, the terminal device 120 can be used by a user. The terminal device 120 can include an application client (for example, an application client 121) that can provide various services to the user. In some cases, the application client 121 can interact with the application server 130. For example, the application client 121 can convert a data object input by the user into a feature representation and encrypt the feature representation to obtain an object cipher state representation, then transmit the object cipher state representation of the data object to the application server 130, and receive, from the application server 130, a response associated with the above-mentioned data object. In this specification, "a response associated with the above-mentioned data object" can refer to various types of responses, such as several pieces of matching data similar to the above-mentioned data object.

In an example, the application server 130 can be a database server. The database server can access a database composed of various types of candidate data, each of which has a corresponding feature representation. Furthermore, the feature representation corresponding to each piece of candidate data in the database server can be encrypted according to an encryption method consistent with the above-mentioned object cipher state representation, to obtain an object cipher state representation corresponding to each piece of candidate data. In an example, the above-mentioned database can be a candidate object cipher state representation database.

It should be understood that all network entities shown in FIG. 1 are explanatory, and any other network entities can be involved in the architecture 100 based on specific application needs.

Figure 2:
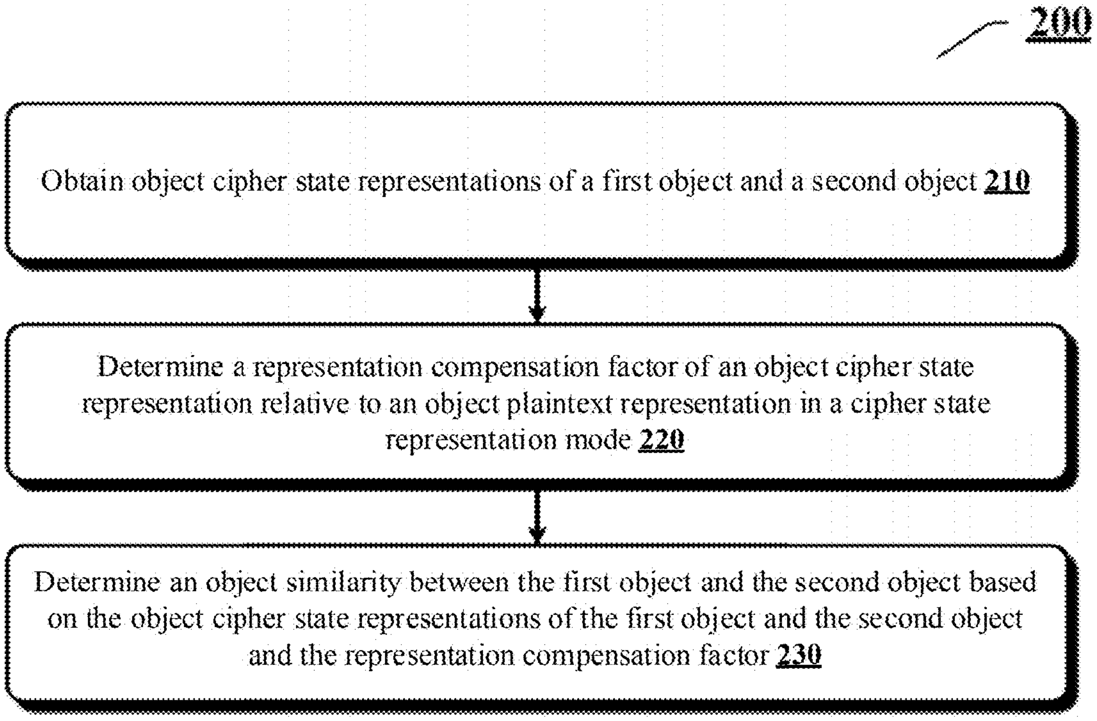
FIG. 2 is an example flowchart illustrating an object similarity determining method, according to some embodiments of this specification.

FIG. 2 is an example flowchart illustrating an object similarity determining method 200, according to some embodiments of this specification. The method 200 is performed by an object similarity determining apparatus.

As shown in FIG. 2, in step 210, object cipher state representations of a first object and a second object are obtained.

In the embodiments, the object cipher state representation can be used to represent an object representation in a specific cipher state mode. Different cipher state modes may correspond to different encryption algorithms. In an example, the object representation can be obtained by extracting the representations of the first object and the second object by using various object representation extraction models (such as item2vec). In an example, the objects can include various subjects that can be compared for similarities, for example, APPs (Applications), applets, and recommended services, or for another example, images, speeches, videos, and texts. In an example, prestored object cipher state representations of the first object and the second object can be obtained directly from a local or communicatively connected device.

In some embodiments, the object cipher state representations of the first object and the second object in a cipher state representation mode can be generated based on object features of the first object and the second object. It can be understood that different objects can have different object features. In an example, a feature of an APP can be obtained based on descriptions of the application, such as classification, a functional description, and a brief description. In an example, image features can include color features, shape features, texture features, etc. In an example, the object features of the first object and the second object can be obtained from a local or communicatively connected device. Next, the obtained object features can be mapped to obtain an object representation, such as embedding of the object features. Afterwards, the object representations of the first object and the second object can be encrypted respectively by using various encryption algorithms to generate the object cipher state representations of the first object and the second object in the cipher state representation mode.

In some embodiments, the object cipher state representation of the first object in the cipher state representation mode can be obtained from a client device. At the client device, the object cipher state representation of the first object can be generated in the cipher state representation mode based on the object feature of the first object. As such, the object similarity determining apparatus can only obtain the object cipher state representation of the first object, and cannot know an original object feature of the first object, thereby preserving data privacy for the object feature of the first object.

In some embodiments, the object cipher state representation of the second object in the cipher state representation mode can be obtained from a third-party device. At the third-party device, the object cipher state representation of the second object can be generated in the cipher state representation mode based on the object feature of the second object. As such, the object similarity determining apparatus can only obtain the object cipher state representation of the second object, and cannot know an original object feature of the second object, thereby preserving data privacy for the object feature of the second object. In addition, this solution can also be combined with obtaining the object cipher state representation of the first object in the cipher state representation mode from the client device to preserve data privacy for original object features of objects from different object providers in a process of determining a similarity between objects.

In step 220, a representation compensation factor of an object cipher state representation relative to an object plaintext representation in a cipher state representation mode is determined.

In the embodiments, because an encryption algorithm introduces effects of encryption keys and unspecific noise, the object cipher state representation in the cipher state representation mode generates a representation bias relative to the object plaintext representation and difficult to reverse-engineer, and the method of determining the similarity between objects based on object plaintext representations thereof cannot be directly used. Therefore, this solution proposes to compensate for a representation bias of the object cipher state representation relative to the object plaintext representation in the cipher state representation mode by using a representation compensation factor, so that a similarity between the object cipher state representations after compensation by the above-mentioned representation compensation factor is closer to a similarity between the corresponding object plaintext representations. It can be understood that different cipher state representation modes correspond to different representation compensation factors.

In an example, the object plaintext representation can be a plaintext form of the object cipher state representation in a plaintext representation mode corresponding to the cipher state representation mode. In some embodiments, the object plaintext representation can be obtained based on an object feature. For example, the object plaintext representation can be a mapping of an object feature of the object.

In some embodiments, the cipher state representation mode is a cipher state representation mode that is based on homomorphic encryption.

In some embodiments, a representation compensation matrix of the object cipher state representation relative to the object plaintext representation in the cipher state representation mode can be constructed based on a public key matrix used in homomorphic encryption. In some examples, the object cipher state representation can be an object cipher state vector.

In an example, the object cipher state representations of the first object and the second object in the cipher state representation mode based on homomorphic encryption can be expressed as $c_1$ and $c_2$ respectively. Using a vector homomorphic encryption (VHE) scheme as an example, a process of performing homomorphic encryption on the object plaintext representation of the first object (for example, it can be expressed as $x_1$) by using the public key matrix (for example, it can be expressed as M) can be expressed as $c_1=M(\omega x_1)+e_1$. Correspondingly, $c_2=M(\omega x_2)+e_2$, where $e_1$ and $e_2$ can be used to represent random error vectors, $x_2$ can be used to represent the object plaintext representation of the second object, and $\omega$ can be used to represent an auxiliary parameter, which can be determined in the process of generating the public key matrix.

In an example, the public key matrix can be obtained by using various key generation methods. In an example, the key generation method can be expressed as KeyGen($\lambda$), where $\lambda$ can be used to represent a security parameter, such as 128 bits or 256 bits. Using VHE as an example, based on the given $\lambda$, a private key matrix S and a public key matrix M can be generated by using the auxiliary parameter w, an identity matrix I, an error matrix E, random matrices A and T, and a pair of reversible matrices $P_sP_m=I$. For example, $S=[I, T]P_s$ and $$M = P_m\begin{bmatrix} I - TA \\ A \end{bmatrix}.$$

In addition, the ciphertext and the plaintext satisfy: $Sc=\omega x+e$, where c, x, and e can be used to represent a ciphertext vector, a plaintext vector, and an error vector respectively. By ensuring that the error matrix E, the random matrices A and T, and the reversible matrices $P_s$ and $P_m$ are not disclosed, reverse-engineering of the private key matrix S and the public key matrix M becomes impossible. The above-mentioned auxiliary parameter ω can be disclosed.

In some embodiments, the representation compensation matrix may be an inverse matrix of the above-mentioned public key matrix. In an example, the inverse matrix of the public key matrix M can be expressed as $B=IM^{-1}$.

In step 230, an object similarity between the first object and the second object is determined based on the object cipher state representations of the first object and the second object and the representation compensation factor.

Figure 3:
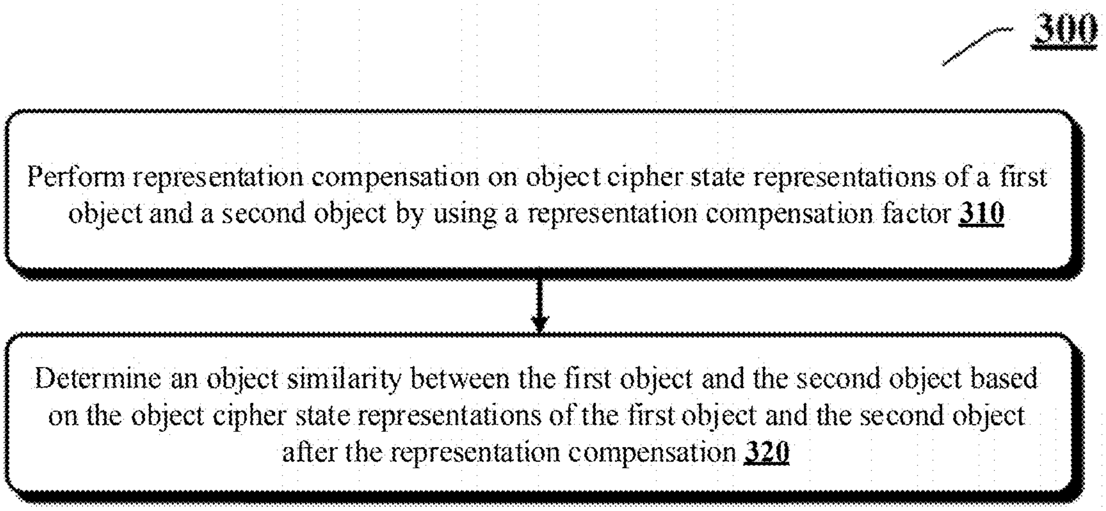
FIG. 3 is an example flowchart illustrating an object similarity determining process, according to some embodiments of this specification.

FIG. 3 is an example flowchart illustrating an object similarity determining process 300, according to some embodiments of this specification.

As shown in FIG. 3, in step 310, representation compensation is performed on the object cipher state representations of the first object and the second object by using the representation compensation factor.

In the embodiments, the object cipher state representations of the first object and the second object can be processed by using the representation compensation factor to compensate for biases of the object cipher state representations of the first object and the second object relative to the object plaintext representations.

In some embodiments, the object cipher state representation can be an object cipher state vector. In an example, referring to the above-mentioned symbols, the object cipher state representations of the first object and the second object after the representation compensation can be expressed as $c_1B$ and $c_2B$ respectively.

In step 320, the object similarity between the first object and the second object is determined based on the object cipher state representations of the first object and the second object after the representation compensation.

Figure 4:
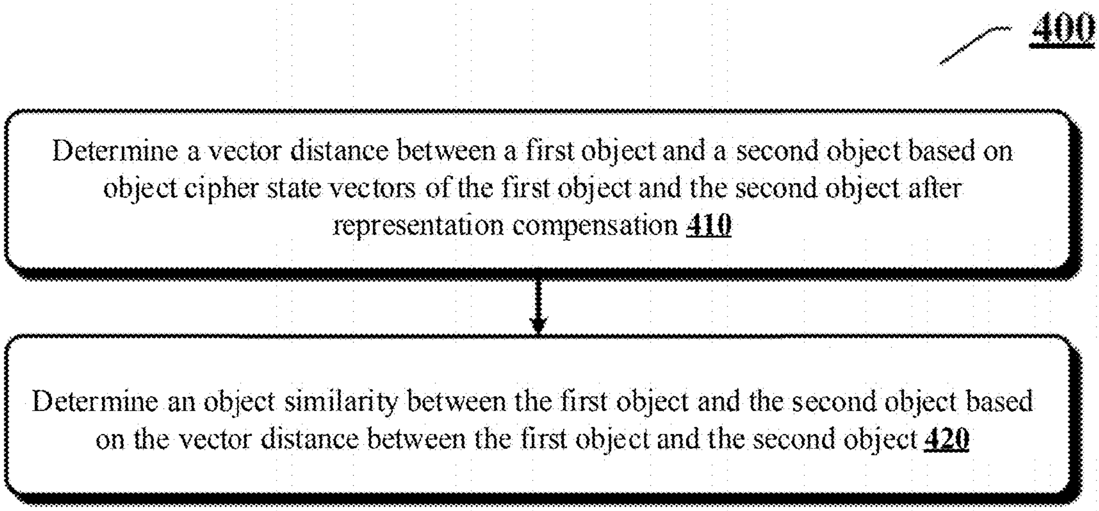
FIG. 4 is another example flowchart illustrating an object similarity determining process, according to some embodiments of this specification.

FIG. 4 is another example flowchart illustrating an object similarity determining process 400, according to some embodiments of this specification.

As shown in FIG. 4, in step 410, a vector distance between the first object and the second object is determined based on object cipher state vectors of the first object and the second object after the representation compensation.

In the embodiments, a vector distance between the object cipher state vectors of the first object and the second object after the representation compensation can be closer to a vector distance between the object plaintext vectors of the first object and the second object. In an example, a Euclidean distance between the object cipher state vectors of the first object and the second object after the representation compensation can be expressed as a length of a difference vector $(c_1B-c_2B)$, which is equivalent to calculating $(c_1-c_2)^TB^TB(c_1-c_2)$. For meanings of the related symbols, reference may to made to the above.

The following is a detailed description of how the vector distance determined above is closer to the vector distance between the corresponding object plaintext vectors.

A feature of homomorphic encryption can be expressed as $Enc((f(m_1,m_2))=f(Enc(m_1), Enc(m_2))$, where $m_1$ and $m_2$ can be used to represent plaintext data, $Enc(m_1)$ and $Enc(m_2)$ can be used to represent corresponding ciphertext data, and $f(\cdot)$ can be used to represent a certain operation, such as addition, subtraction, or multiplication. The above-mentioned formula means that the plaintext data $m_1$ and $m_2$ are first calculated and then encrypted, which is equivalent to first encrypting and then calculating.

Referring to the above-mentioned symbols, $(c_1-c_2)^TB^TB(c_1-c_2)=[M(\omega x_1)+e_1-M(\omega x_2)-e_2]^TB^TB[M(\omega x_1)+e_1-M(\omega x_2)-e_2]$. Due to the above-mentioned feature of homomorphic encryption, $M(\omega x_1)-M(\omega x_2)$ is equivalent to $M(\omega(x_1-x_2))$. Therefore, $[M(\omega x_1)+e_1-M(\omega x_2)-e_2]^TB^TB[M(\omega x_1)+e_1-M(\omega x_2)-e_2]=[BM(\omega(x_1-x_2)+B(e_1-e_2)]^T[BM(\omega(x_1-x_2)+B(e_1-e_2)]=[(\omega(x_1-x_2)+B(e_1-e_2)]^T[(\omega(x_1-x_2)+B(e_1-e_2)]=\omega^2(x_1-x_2)^2+\text{error}$.

It can be seen that the above $(x_1-x_2)^2$ can be used to represent a square of the Euclidean distance between the object plaintext vector $x_1$ of the first object and the object plaintext vector $x_2$ of the second object. Therefore, a change trend of a calculation result of the above $(c_1-c_2)^TB^TB(c_1-c_2)$ can be consistent with a change trend of a distance between the corresponding object plaintext vectors.

In some examples, the vector distance between the object cipher state vectors of the first object and the second object after the representation compensation can also be expressed as $(c_1-c_2)^TB^TB(c_1-c_2)/\omega\omega^2$. In an example, ω can match the above-mentioned public key matrix. Because it is usually a very large integer, the above error item (error) can be ignored, that is, the above $(c_1-c_2)^TB^TB(c_1-c_2)/\omega\omega^2$ can be approximately expressed as $(x_1-x_2)^2$.

In some examples, the vector distance can also include, but is not limited to, a cosine distance or a cosine similarity. In an example, the cosine distance can be expressed as $$\frac{1}{2}(c_1 - c_2)^T B^T B (c_1 - c_2) / \omega^2.$$

In an example, the cosine similarity may be expressed as $$1 - \frac{1}{2}(c_1 - c_2)^T B^T B (c_1 - c_2) / \omega^2.$$

It is worthwhile to note that a relationship between the cosine similarity and the Euclidean distance can be expressed as $\|x_1-x_2\|_2=\sqrt{2(1-\cos(x_1,x_2))}$, from which the cosine similarity $$\cos(x_1, x_2) = 1 - \frac{1}{2}(x_1 - x_2)^2 = 1 - \frac{1}{2}(x_1 - x_2)^T(x_1 - x_2)$$

can be deduced. Similarly, the cosine distance $$d\cos(x_1, x_2) = 1 - \cos(x_1, x_2) = \frac{1}{2}(x_1 - x_2)^2 = \frac{1}{2}(x_1 - x_2)^T(x_1 - x_2)$$

can be deduced.

Based on this, this solution provides a solution for equivalently calculating the Euclidean distance, cosine similarity, and/or cosine distance between the object plaintext representations by using the object cipher state representations of the first object and the second object after the representation compensation, which enriches the object similarity determining method. Moreover, the cosine similarity limits a value to a specified range, which facilitates setting a required threshold based on an actual application scenario.

In step 420, the object similarity between the first object and the second object is determined based on the vector distance between the first object and the second object.

In the embodiments, the object similarity between the first object and the second object can be determined based on the vector distance between the first object and the second object. In an example, the larger the Euclidean distance or the cosine distance, the smaller the object similarity. In an example, the larger the cosine similarity, the greater the object similarity.

According to the object similarity determining method disclosed in FIG. 1 to FIG. 4, the object similarity between the first object and the second object can be determined by determining the representation compensation factors of the object cipher state representations of the first object and the second object relative to the corresponding object plaintext representations in the cipher state representation mode, and referring to the object cipher state representations of the first object and the second object, thereby providing a new object similarity determining method based on object cipher state representations.

Figure 5:
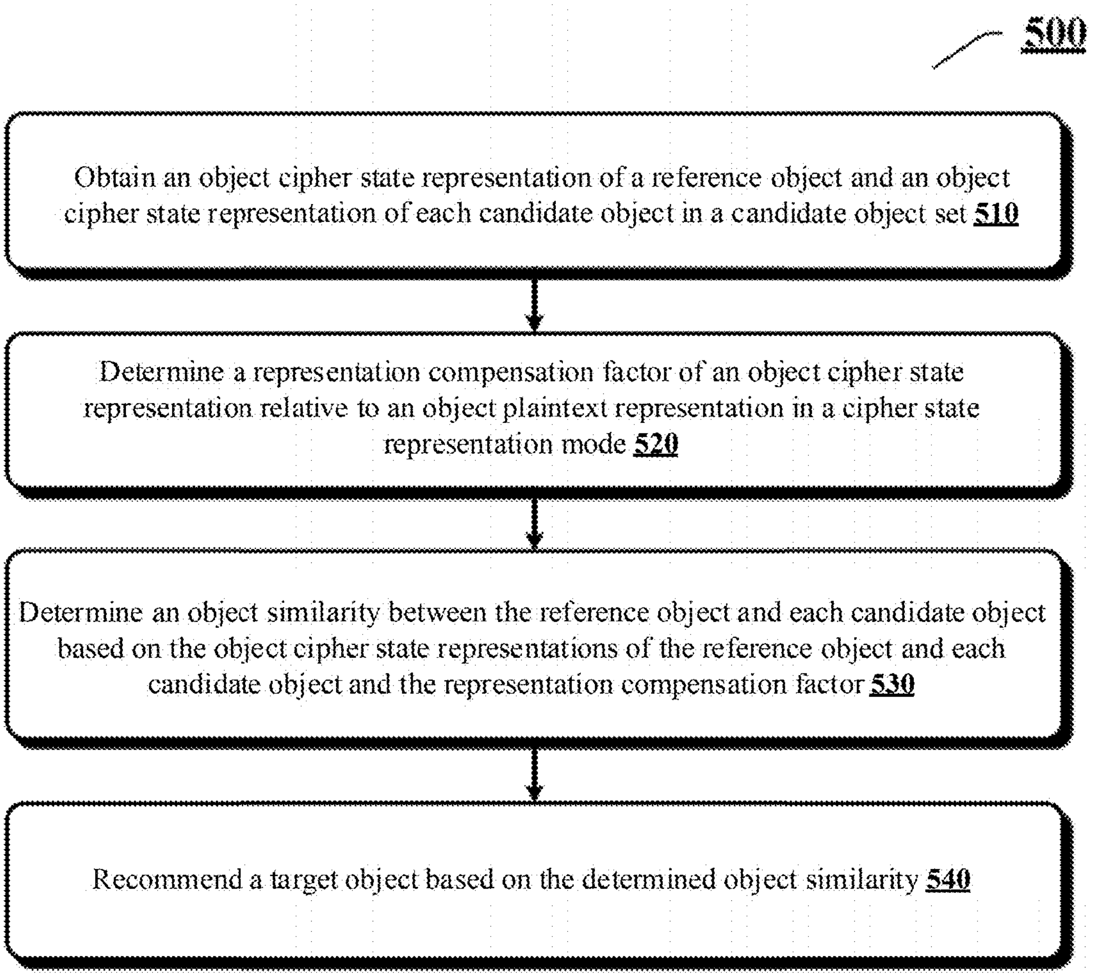
FIG. 5 is an example flowchart illustrating an object recommendation method, according to some embodiments of this specification.

The following makes reference to FIG. 5. FIG. 5 is an example flowchart illustrating an object recommendation method 500, according to some embodiments of this specification. The method 500 is performed by an object recommendation apparatus.

As shown in FIG. 5, in step 510, an object cipher state representation of a reference object and an object cipher state representation of each candidate object in a candidate object set are obtained.

In the embodiments, the reference object usually matches the candidate object set. In an example, the reference object can be an image, and the candidate object set can be a candidate image set. In an example, the reference object can be a text, and the candidate object set can be a candidate text set. In an example, the reference object can be a user portrait, and the candidate object set can be a candidate product set. For the detailed description of the above-mentioned object cipher state representation, reference can be made to the corresponding description in the above-mentioned embodiment in FIG. 2.

In some embodiments, the object cipher state representation of the reference object can be generated by a client device in a cipher state representation mode based on an object feature of the reference object. In an example, the client device can generate the object cipher state representation based on the object feature of the reference object, and then provide the generated object cipher state representation of the reference object to the object recommendation apparatus.

In some embodiments, the object cipher state representation of each candidate object can be obtained from a candidate object cipher state representation database. The object cipher state representation of each candidate object can be generated in the cipher state representation mode based on an object feature of each candidate object. Generally, the object cipher state representation of the reference object and the cipher state representation mode corresponding to the object cipher state representation of each candidate object are consistent. In an example, the client device uses an encryption method same as the encryption method of the candidate object cipher state representation database to generate the object cipher state representation of the reference object. In an example, homomorphic encryption can be performed on the candidate object cipher state representation database by using a public key matrix (for example, it can be expressed as M), and a plaintext representation of the object feature of each candidate object can be expressed as $\{x_1, x_2, \ldots, x_n\}$. Correspondingly, the corresponding object cipher state representation can be expressed as $\{c_1, c_2, \ldots, c_n\}$, where $c_i=M(\omega x_i)+e_i$. In this case, the object cipher state representation of the reference object can be encrypted by using the same public key matrix, expressed as $c_q=M(\omega q)+e_q$. For the related symbols and a specific operation of the above step, reference can be made to the related description of step 220 in the above-mentioned embodiments. In an example, the reference object can also be an object to be queried, such as a face image. Correspondingly, the candidate object cipher state representation database may store object cipher state representations of multiple candidate face images.

In step 520, a representation compensation factor of an object cipher state representation relative to an object plaintext representation in the cipher state representation mode is determined.

For a specific operation of the above step, reference can be made to the related description of step 220 in the above-mentioned embodiments.

In step 530, an object similarity between the reference object and each candidate object is determined based on the object cipher state representations of the reference object and each candidate object and the representation compensation factor.

In step 540, a target object is recommended based on the determined object similarity.

In the embodiments, the target object can be determined from the candidate object set in various ways. In an example, top N (for example, 10) candidate objects (for example, images, documents, and products) with the largest corresponding object similarity can be determined from the candidate object set as target objects for recommendation. In an example, candidate objects with corresponding object similarities greater than a predetermined threshold (for example, 0.7) can be determined from the candidate object set as target objects for recommendation.

By using the above-mentioned method, an object recommendation method based on object cipher state representations can be provided.

Figure 6:
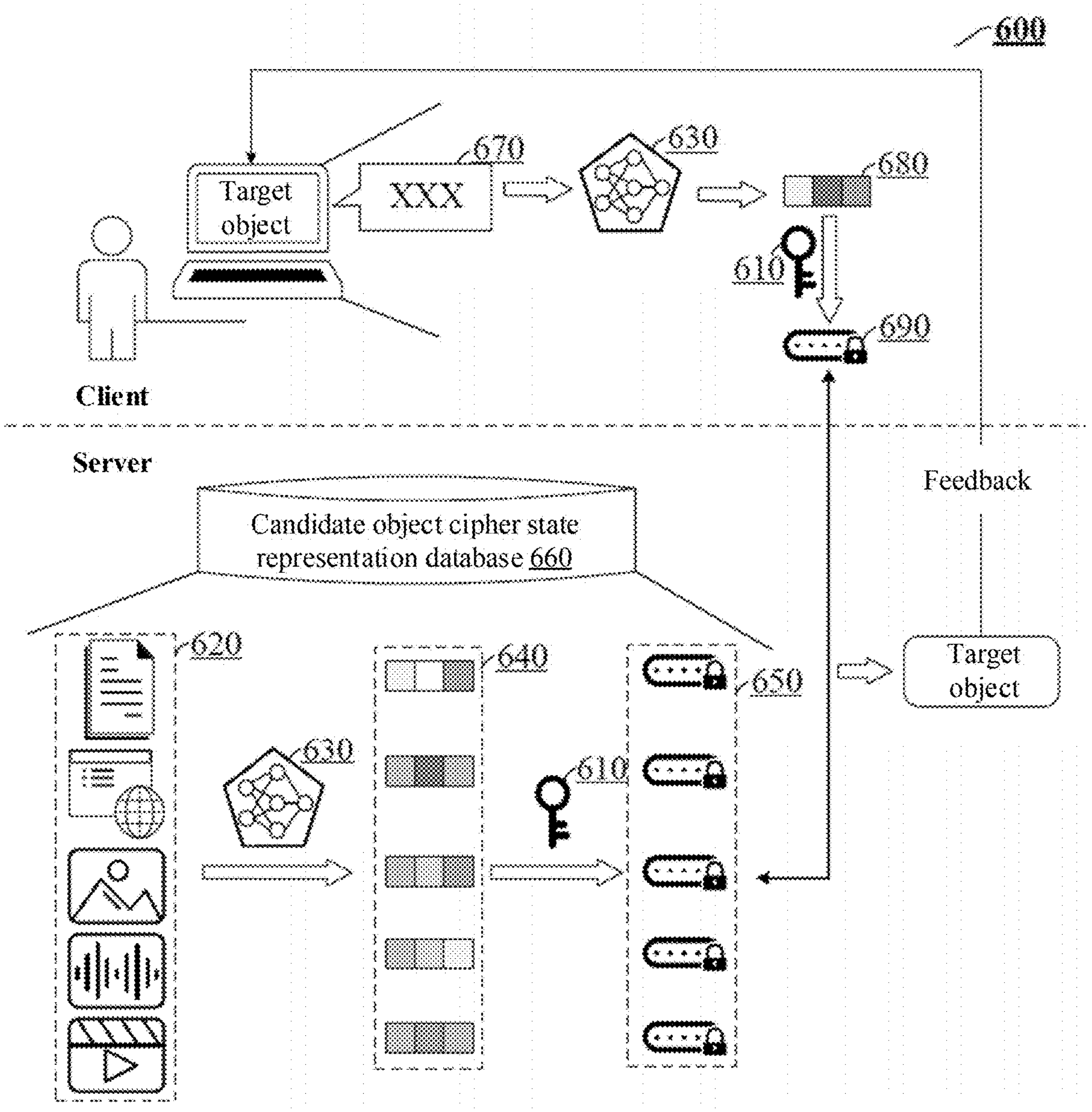
FIG. 6 is an example schematic diagram illustrating an application scenario of an object recommendation method, according to some embodiments of this specification.

The following makes reference to FIG. 6. FIG. 6 is an example schematic diagram illustrating an application scenario 600 of an object recommendation method, according to some embodiments of this specification.

As shown in FIG. 6, a client device and a server device can respectively obtain a key 610 for encryption. In an example, the key 610 can be obtained from a trusted third-party device. On the server device, a database provider device can provide a candidate object set 620. Each candidate object in the candidate object set 620 can include, for example, at least one of text data, web page data, image data, audio data, and video data. By using a pre-trained object representation extraction model 630, each candidate object in the candidate object set 620 can be converted into a corresponding object plaintext representation 640. In an example, the object representation extraction model can be obtained through training by the server device or provided by a third-party device. Next, the object plaintext representation 640 can also be encrypted on the server device by using the key 610 to obtain a corresponding object cipher state representation 650. In some examples, a related index can be further established to construct a candidate object cipher state representation database 660. It can be understood that there is a correspondence between each object cipher state representation and a corresponding object plaintext representation and candidate object.

On the client device, a user can input to-be-queried information 670. In an example, the to-be-queried information 670 can be a speech, a character, a picture, a video, etc. Next, the to-be-queried information 670 can be converted into a corresponding object plaintext representation 680 by using the object representation extraction model 630 on the client device. In an example, the object representation extraction model 630 can be stored by the client device or provided by a third-party device. Next, the object plaintext representation 680 can also be encrypted on the client device by using the key 610 to obtain a corresponding object cipher state representation 690.

After receiving the above-mentioned object cipher state representation 690, the server device can determine representation compensation factors of the object cipher state representations 650 and 690 relative to the object plaintext representations 640 and 680 in a cipher state representation mode. The cipher state representation mode can be embodied by the above-mentioned key 610. Afterwards, an object similarity between the to-be-queried information 670 and each candidate object 620 can be determined based on the object cipher state representation 690 of the to-be-queried information 670 and the object cipher state representation 650 of each candidate object 620 and the above-mentioned determined representation compensation factor. Then, based on the determined object similarity, a target object is determined from the candidate object set 620, and the determined target object is provided to the client device used by the user.

By using the object recommendation method disclosed in FIG. 5 and FIG. 6, the above-mentioned object similarity determining method can be applied to object recommendation, thereby providing a reference for object recommendation by calculating an object similarity based on object cipher state representations, thereby facilitating object recommendation while preserving privacy.

Figure 7:
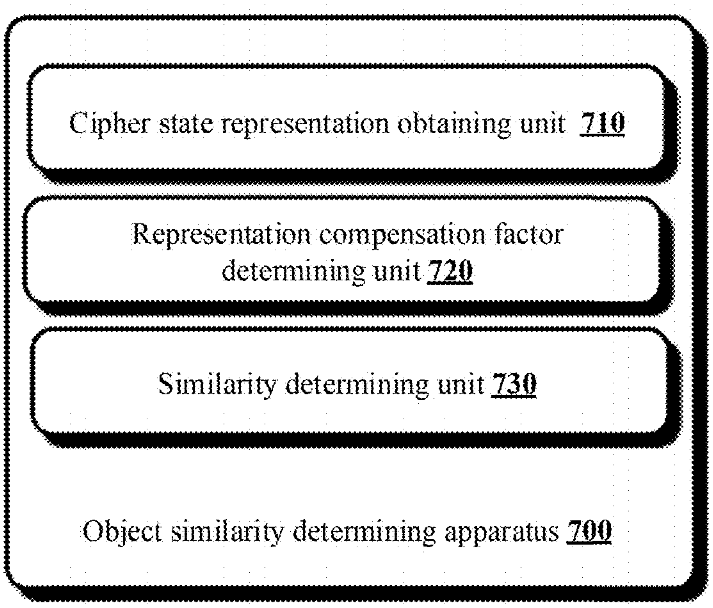
FIG. 7 is an example block diagram illustrating an object similarity determining apparatus, according to some embodiments of this specification.

The following makes reference to FIG. 7. FIG. 7 is an example block diagram illustrating an object similarity determining apparatus 700, according to some embodiments of this specification. The apparatus embodiments may correspond to the method embodiments shown in FIG. 2 to FIG. 4, and the apparatus may be specifically applied to various electronic devices.

As shown in FIG. 7, the object similarity determining apparatus 700 can include a cipher state representation obtaining unit 710, a representation compensation factor determining unit 720, and a similarity determining unit 730.

The cipher state representation obtaining unit 710 is configured to obtain object cipher state representations of a first object and a second object.

In an example, the cipher state representation obtaining unit 710 can be further configured to generate the object cipher state representations of the first object and the second object in a cipher state representation mode based on object features of the first object and the second object.

In an example, the cipher state representation obtaining unit 710 can be further configured to obtain the object cipher state representation of the first object in the cipher state representation mode from a client device, where the object cipher state representation of the first object in the cipher state representation mode is generated based on an object feature of the first object.

In an example, the cipher state representation obtaining unit 710 can be further configured to obtain the object cipher state representation of the second object in the cipher state representation mode from a third-party device, where the object cipher state representation of the second object in the cipher state representation mode is generated based on an object feature of the second object.

The representation compensation factor determining unit 720 is configured to determine a representation compensation factor of an object cipher state representation relative to an object plaintext representation in the cipher state representation mode.

In an example, the cipher state representation mode includes a cipher state representation mode that is based on homomorphic encryption.

In an example, the representation compensation factor determining unit 720 can be further configured to construct, based on a public key matrix used in homomorphic encryption, a representation compensation matrix of the object cipher state representation relative to the object plaintext representation in the cipher state representation mode.

In an example, the representation compensation matrix is an inverse matrix of the public key matrix.

The similarity determining unit 730 is configured to determine an object similarity between the first object and the second object based on the object cipher state representations of the first object and the second object and the representation compensation factor.

Figure 8:
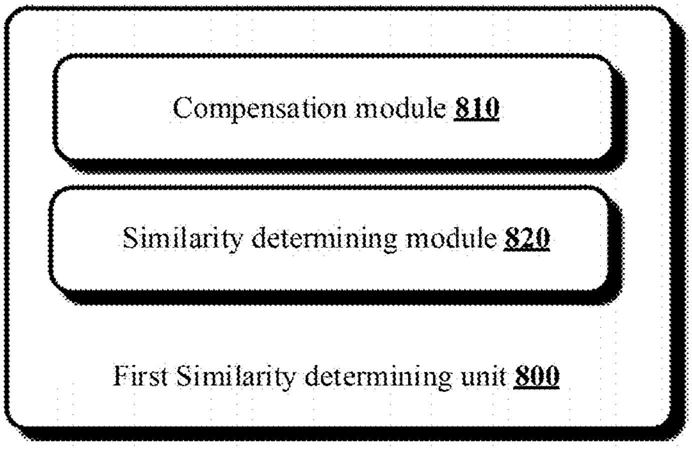
FIG. 8 is an example block diagram illustrating a similarity determining unit in an object similarity determining apparatus, according to some embodiments of this specification.

The following makes reference to FIG. 8. FIG. 8 is an example block diagram illustrating a similarity determining unit 800 in an object similarity determining apparatus, according to some embodiments of this specification.

As shown in FIG. 8, the similarity determining unit 800 can include a compensation module 810 and a similarity determining module 820.

The compensation module 810 is configured to perform representation compensation on the object cipher state representations of the first object and the second object by using the representation compensation factor.

The similarity determining module 820 is configured to determine the object similarity between the first object and the second object based on the object cipher state representations of the first object and the second object after the representation compensation.

In an example, the object cipher state representation includes an object cipher state vector. The similarity determining module 820 can be further configured to determine a vector distance between the first object and the second object based on object cipher state vectors of the first object and the second object after the representation compensation; and determine the object similarity between the first object and the second object based on the vector distance between the first object and the second object.

For operations of the cipher state representation obtaining unit 710, the representation compensation factor determining unit 720, and the similarity determining unit 730, and operations of the compensation module 810 and the similarity determining module 820, reference can be made to the corresponding descriptions in the above-mentioned embodiments in FIG. 2 to FIG. 4.

Figure 9:
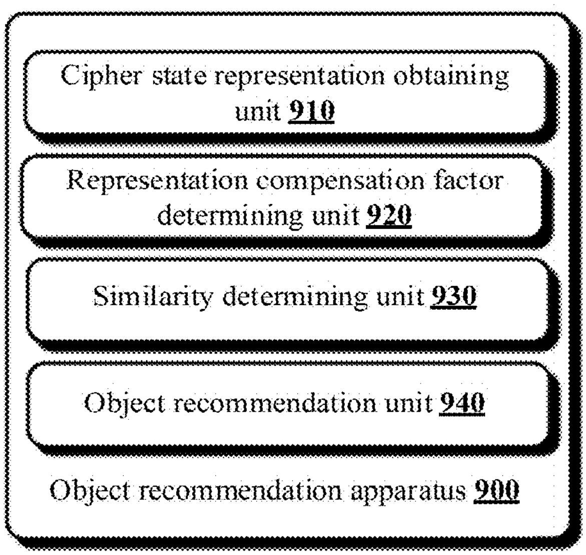
FIG. 9 is an example block diagram illustrating an object recommendation apparatus, according to some embodiments of this specification.

With continued reference to FIG. 9, FIG. 9 is an example block diagram illustrating an object recommendation apparatus 900, according to some embodiments of this specification. The apparatus embodiments may correspond to the method embodiments shown in FIG. 5 and FIG. 6, and the apparatus may be specifically applied to various electronic devices.

As shown in FIG. 9, the object recommendation apparatus 900 can include a cipher state representation obtaining unit 910, a representation compensation factor determining unit 920, a similarity determining unit 930, and an object recommendation unit 940.

The cipher state representation obtaining unit 910 is configured to obtain an object cipher state representation of a reference object and an object cipher state representation of each candidate object in a candidate object set.

In an example, the cipher state representation obtaining unit 910 can be further configured to obtain the object cipher state representation of the reference object from a client device, where the object cipher state representation of the reference object is generated at the client device in a cipher state representation mode based on an object feature of the reference object.

In an example, the cipher state representation obtaining unit 910 can be further configured to obtain the object cipher state representation of each candidate object from a candidate object cipher state representation database, where the object cipher state representation of each candidate object is generated in the cipher state representation mode based on an object feature of each candidate object.

The representation compensation factor determining unit 920 is configured to determine a representation compensation factor of an object cipher state representation relative to an object plaintext representation in the cipher state representation mode.

The similarity determining unit 930 is configured to determine an object similarity between the reference object and each candidate object based on the object cipher state representations of the reference object and each candidate object and the representation compensation factor.

The object recommendation unit 940 is configured to recommend a target object based on the determined object similarity.

For operations of the cipher state representation obtaining unit 910, the representation compensation factor determining unit 920, the similarity determining unit 930, and the object recommendation unit 940, reference can be made to the corresponding descriptions in the above-mentioned embodiments in FIG. 5 and FIG. 6.

Embodiments of the object similarity determining methods and apparatuses, and the object recommendation methods and apparatuses according to embodiments of this specification have been described above with reference to FIG. 1 to FIG. 9.

The object similarity determining apparatuses and the object recommendation apparatuses according to embodiments of this specification can be implemented by using hardware, or can be implemented by using software or a combination of hardware and software. Software implementation is used as an example. As a logical apparatus, the apparatus is formed by reading corresponding computer program instructions in a storage to a memory by a processor of a device in which the apparatus is located. In embodiments of this specification, for example, the object similarity determining apparatuses and the object recommendation apparatuses can be implemented by using electronic devices.

Figure 10:
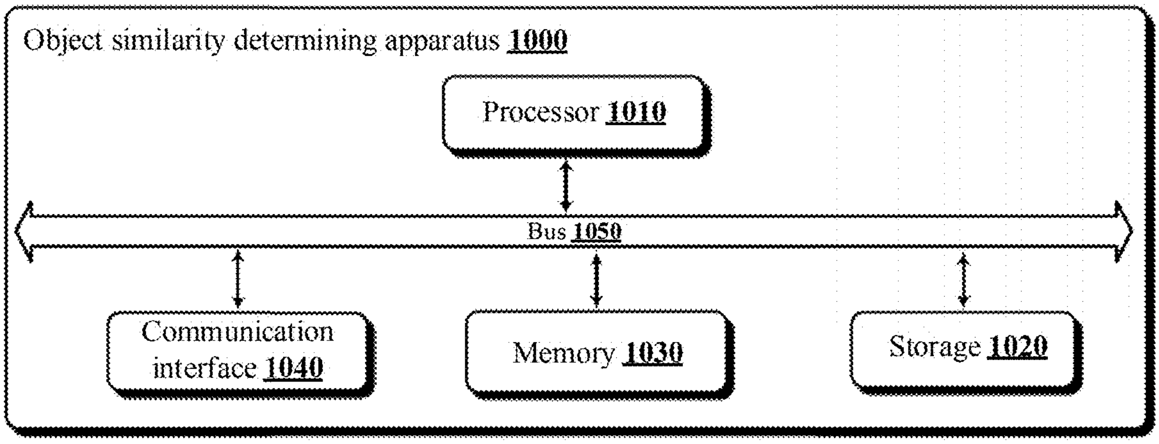
FIG. 10 is an example schematic diagram illustrating an object similarity determining apparatus, according to some embodiments of this specification.

FIG. 10 is an example schematic diagram illustrating an object similarity determining apparatus 1000, according to some embodiments of this specification.

As shown in FIG. 10, the object similarity determining apparatus 1000 can include at least one processor 1010, a storage (for example, a nonvolatile memory) 1020, a memory 1030, and a communication interface 1040. The at least one processor 1010, the storage 1020, the memory 1030, and the communication interface 1040 are connected together through a bus 1050. The at least one processor 1010 executes at least one computer-readable instruction (i.e., the above-mentioned elements implemented in a form of software) stored or encoded in the storage.

In an embodiment, computer-executable instructions are stored in the storage, and when the instructions are executed, the at least one processor 1010 is enabled to perform the above-mentioned object similarity determining method.

It should be understood that, when the computer-executable instructions stored in the storage are executed, the at least one processor 1010 is enabled to perform the above-mentioned operations and functions described with reference to FIG. 2 to FIG. 4 in the embodiments of this specification.

Figure 11:
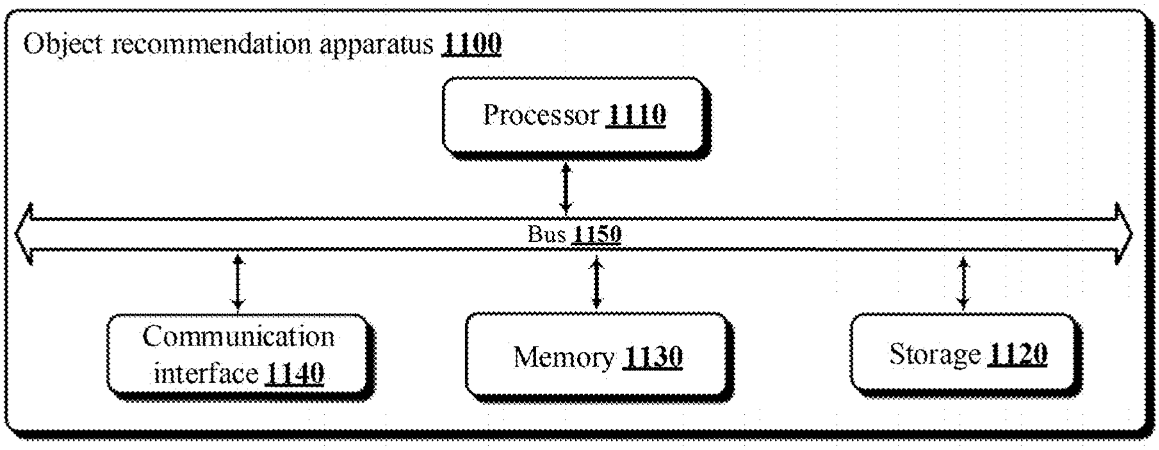
FIG. 11 is an example schematic diagram illustrating an object recommendation apparatus, according to some embodiments of this specification.

FIG. 11 is an example schematic diagram illustrating an object recommendation apparatus 1100, according to some embodiments of this specification.

As shown in FIG. 11, the object recommendation apparatus 1100 can include at least one processor 1110, a storage (for example, a nonvolatile memory) 1120, a memory 1130, and a communication interface 1140. The at least one processor 1110, the storage 1120, the memory 1130, and the communication interface 1140 are connected together through a bus 1150. The at least one processor 1110 executes at least one computer-readable instruction (i.e., the above-mentioned elements implemented in a form of software) stored or encoded in the storage.

In an embodiment, computer-executable instructions are stored in the storage, and when the instructions are executed, the at least one processor 1110 is enabled to perform the above-mentioned object recommendation method.

It should be understood that, when the computer-executable instructions stored in the storage are executed, the at least one processor 1110 is enabled to perform the above-mentioned operations and functions described with reference to FIG. 5 and FIG. 6 in the embodiments of this specification.

According to an embodiment, a program product such as a computer-readable medium is provided. The computer-readable medium can have instructions (to be specific, the above-mentioned elements implemented in a form of software). When the instructions are executed by a computer, the computer is enabled to perform the above-mentioned operations and functions described with reference to FIG. 1 to FIG. 6 in the embodiments of this specification.

Specifically, a system or an apparatus equipped with a readable storage medium can be provided, and software program code for implementing the functions in any one of the above-mentioned embodiments is stored in the readable storage medium, so that a computer or a processor of the system or the apparatus reads and executes the instructions stored in the readable storage medium.

In this case, the program code read from the readable medium can implement the functions in any one of the above-mentioned embodiments, and therefore the machine-readable code and the readable storage medium storing the machine-readable code form a part of this application.

Computer program code needed for operations in each part of this specification can be compiled in any one or more programming languages, including an object-oriented programming language such as Java, Scala, Smalltalk, Eiffel, JADE, Emerald, C++, C#, VB, NET, and Python, a conventional programming language such as C language, Visual Basic 2003, Perl, COBOL 2002, PHP, and ABAP, a dynamic programming language such as Python, Ruby, and Groovy, or another programming language. The program code can be run on a user computer, or on a user computer as an independent software package, or partly on a user computer and partly on a remote computer, or completely on a remote computer or server. In the latter case, the remote computer can be connected to the user computer through any form of network, such as a local area network (LAN) or a wide area network (WAN), or connected to an external computer (for example, via the Internet), or in a cloud computing environment, or used as a service, such as software as a service (SaaS).

Embodiments of the readable storage medium include a floppy disk, a hard disk, a magneto-optical disk, an optical disc (for example, a CD-ROM, a CD-R, a CD-RW, a DVD-ROM, a DVD-RAM, and a DVD-RW), a magnetic tape, a nonvolatile memory card, and a ROM. Alternatively, the program code can be downloaded from a server computer or a cloud over a communication network.

Specific embodiments of this specification are described above. Other embodiments fall within the scope of the appended claims. In some cases, actions or steps described in the claims can be performed in an order different from that in the embodiments and desired results can still be achieved. In addition, processes described in the accompanying drawings do not necessarily need a specific order or a sequential order shown to achieve the desired results. In some implementations, multitasking and parallel processing are also feasible or may be advantageous.

Not all steps and units in the above-mentioned procedures and system structure diagrams are necessary. Some steps or units can be ignored based on actual needs. An execution order of the steps is not fixed, and can be determined based on needs. The apparatus structure described in the above-mentioned embodiments can be a physical structure or a logical structure. In other words, some units can be implemented by the same physical entity, or some units can be implemented by a plurality of physical entities, or can be implemented together by some components in a plurality of independent devices.

The term "example" used throughout this specification means "used as an example, an instance, or an illustration" and does not mean "preferred" or "advantageous" over other embodiments. Specific implementations include specific details for the purpose of providing an understanding of the described technologies. However, these technologies can be implemented without these specific details. In some examples, well-known structures and apparatuses are shown in block diagrams, to avoid difficulty in understanding the concepts of the described embodiments.

Optional implementations of the embodiments of this specification are described above with reference to the accompanying drawings. However, the embodiments of this specification are not limited to specific details in the above-mentioned implementations. Within the scope of the technical concept of the embodiments of this specification, multiple simple variations can be made to the technical solutions of the embodiments of this specification, and these simple variations are all within the protection scope of the embodiments of this specification.

The above descriptions of the content of this specification are provided to enable any person of ordinary skill in the art to implement or use the content of this specification. Various modifications to the content of this specification are clear to a person of ordinary skill in the art. In addition, the general principle defined in this specification can be applied to other variations without departing from the protection scope of the content of this specification. Therefore, the content of this specification is not limited to the examples and designs described here, but aligns with the broadest scope of principles and novelty features that conform to this disclosure.

What is claimed is:

1. A computer-implemented method, comprising:

obtaining object cipher state representations of a first object and a second object;

determining a representation compensation factor of an object cipher state representation relative to an object plaintext representation in a cipher state representation mode; and determining an object similarity between the first object and the second object based on the object cipher state representations of the first object and the second object and the representation compensation factor, wherein the determining an object similarity between the first object and the second object based on the object cipher state representations of the first object and the second object and the representation compensation factor comprises:

performing representation compensation by applying the representation compensation factor to the object cipher state representations of the first object and the second object respectively to obtain object cipher state representations of the first object and the second object after the representation compensation; and determining the object similarity between the first object and the second object based on the object cipher state representations of the first object and the second object after the representation compensation, wherein the object similarity is used to recommend a target object.

2. The computer-implemented method according to claim 1, wherein the obtaining object cipher state representations of a first object and a second object comprises:

generating the object cipher state representations of the first object and the second object in the cipher state representation mode based on object features of the first object and the second object.

3. The computer-implemented method according to claim 1, wherein the obtaining an object cipher state representation of a first object comprises:

obtaining the object cipher state representation of the first object in the cipher state representation mode from a client device, wherein the object cipher state representation of the first object in the cipher state representation mode is generated based on an object feature of the first object.

4. The computer-implemented method according to claim 1, wherein the obtaining an object cipher state representation of a second object comprises:

obtaining the object cipher state representation of the second object in the cipher state representation mode from a third-party device, wherein the object cipher state representation of the second object in the cipher state representation mode is generated based on an object feature of the second object.

5. The computer-implemented method according to claim 1, wherein the applying the representation compensation factor to the object cipher state representations of the first object and the second object respectively to obtain object cipher state representations of the first object and the second object after the representation compensation comprises multiplying the object cipher state representations of the first object and the second object with the representation compensation factor respectively to generate the object cipher state representations of the first object and the second object after the representation compensation.

6. The computer-implemented method according to claim 1, wherein the cipher state representation mode comprises a cipher state representation mode that is based on homomorphic encryption.

7. The computer-implemented method according to claim 6, wherein the determining a representation compensation factor of an object cipher state representation relative to an object plaintext representation in a cipher state representation mode comprises:

constructing, based on a public key matrix used in homomorphic encryption, a representation compensation matrix of the object cipher state representation relative to the object plaintext representation in the cipher state representation mode.

8. The computer-implemented method according to claim 7, wherein the representation compensation matrix comprises an inverse matrix of the public key matrix.

9. The computer-implemented method according to claim 5, wherein the object cipher state representation comprises an object cipher state vector, and the determining the object similarity between the first object and the second object based on the object cipher state representations of the first object and the second object after the representation compensation comprises:

determining a vector distance between the first object and the second object based on object cipher state vectors of the first object and the second object after the representation compensation; and determining the object similarity between the first object and the second object based on the vector distance between the first object and the second object.

10. A computer-implemented method for an object recommendation, comprising:

obtaining an object cipher state representation of a reference object and an object cipher state representation of each candidate object in a candidate object set;

determining a representation compensation factor of an object cipher state representation relative to an object plaintext representation in a cipher state representation mode;

determining an object similarity between the reference object and each candidate object based on the object cipher state representations of the reference object and each candidate object and the representation compensation factor, wherein the determining an object similarity between the reference object and each candidate object based on the object cipher state representations of the reference object and each candidate object and the representation compensation factor comprises:

performing representation compensation by applying the representation compensation factor to the object cipher state representations of the reference object and the candidate object respectively to generate object cipher state representations of the reference object and the candidate object after the representation compensation; and determining the object similarity between the reference object and the candidate object based on the object cipher state representations of the reference object and the candidate object after the representation compensation; and recommending a target object based on the object similarity.

11. The computer-implemented method according to claim 10, wherein the obtaining an object cipher state representation of a reference object comprises:

obtaining the object cipher state representation of the reference object from a client device, wherein the object cipher state representation of the reference object is generated at the client device in the cipher state representation mode based on an object feature of the reference object.

12. The computer-implemented method according to claim 10, wherein the obtaining an object cipher state representation of each candidate object in a candidate object set comprises:

obtaining the object cipher state representation of each candidate object from a candidate object cipher state representation database, wherein the object cipher state representation of each candidate object is generated in the cipher state representation mode based on an object feature of each candidate object.

13. An apparatus, comprising:

one or more processors; and one or more tangible, non-transitory, machine-readable media storing one or more instructions that, when executed by the one or more processors, perform one or more operations comprising:

obtaining object cipher state representations of a first object and a second object;

determining a representation compensation factor of an object cipher state representation relative to an object plaintext representation in a cipher state representation mode; and determining an object similarity between the first object and the second object based on the object cipher state representations of the first object and the second object and the representation compensation factor, wherein the determining an object similarity between the first object and the second object based on the object cipher state representations of the first object and the second object and the representation compensation factor comprises:

performing representation compensation by applying the representation compensation factor to the object cipher state representations of the first object and the second object respectively to obtain object cipher state representations of the first object and the second object after the representation compensation; and determining the object similarity between the first object and the second object based on the object cipher state representations of the first object and the second object after the representation compensation, wherein the object similarity is used to recommend a target object.

14. The apparatus according to claim 13, wherein the obtaining object cipher state representations of a first object and a second object comprises:

generating the object cipher state representations of the first object and the second object in the cipher state representation mode based on object features of the first object and the second object.

15. The apparatus according to claim 13, wherein the obtaining an object cipher state representation of a first object comprises:

obtaining the object cipher state representation of the first object in the cipher state representation mode from a client device, wherein the object cipher state representation of the first object in the cipher state representation mode is generated based on an object feature of the first object.

16. The apparatus according to claim 13, wherein the obtaining an object cipher state representation of a second object comprises:

obtaining the object cipher state representation of the second object in the cipher state representation mode from a third-party device, wherein the object cipher state representation of the second object in the cipher state representation mode is generated based on an object feature of the second object.

17. The apparatus according to claim 13, wherein the applying the representation compensation factor to the object cipher state representations of the first object and the second object respectively to obtain object cipher state representations of the first object and the second object after the representation compensation comprises multiplying the object cipher state representations of the first object and the second object with the representation compensation factor respectively to generate the object cipher state representations of the first object and the second object after the representation compensation.

18. The apparatus according to claim 17, wherein the object cipher state representation comprises an object cipher state vector, and the determining the object similarity between the first object and the second object based on the object cipher state representations of the first object and the second object after the representation compensation comprises:

determining a vector distance between the first object and the second object based on object cipher state vectors of the first object and the second object after the representation compensation; and determining the object similarity between the first object and the second object based on the vector distance between the first object and the second object.

19. The apparatus according to claim 13, wherein the cipher state representation mode comprises a cipher state representation mode that is based on homomorphic encryption.

20. The apparatus according to claim 19, wherein the determining a representation compensation factor of an object cipher state representation relative to an object plaintext representation in a cipher state representation mode comprises:

constructing, based on a public key matrix used in homomorphic encryption, a representation compensation matrix of the object cipher state representation relative to the object plaintext representation in the cipher state representation mode.

* * * * *